March 14, 1961    E. G. ROEHM    2,974,756
AUTOMATIC RESET BRAKE RELEASE
Filed March 3, 1958    2 Sheets-Sheet 1

INVENTOR.
ELDRON G. ROEHM
BY Tom Walker
ATTORNEY

March 14, 1961 E. G. ROEHM 2,974,756
AUTOMATIC RESET BRAKE RELEASE
Filed March 3, 1958 2 Sheets-Sheet 2
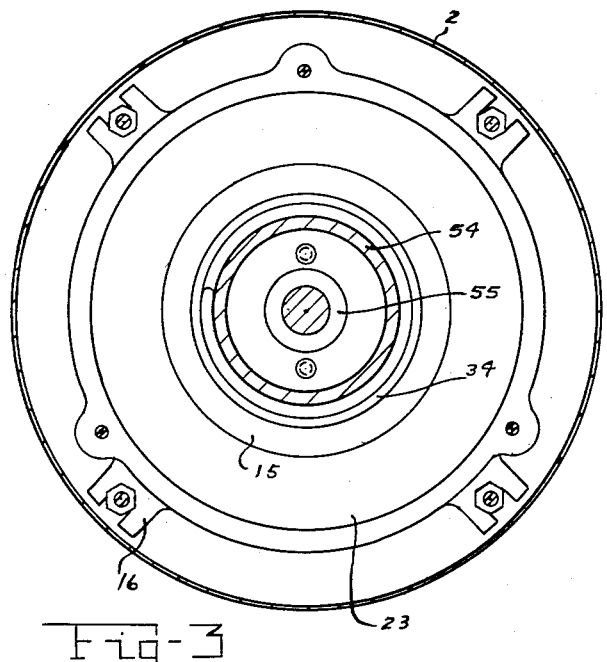
Fig-3
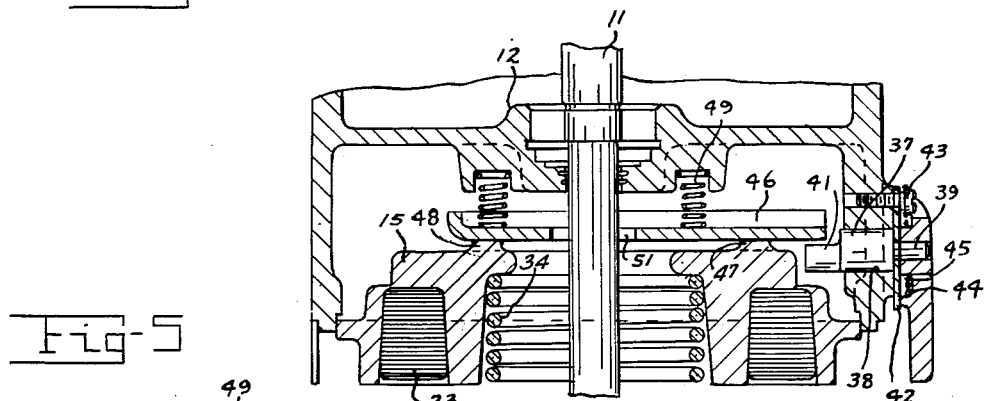
Fig-5 Fig-4
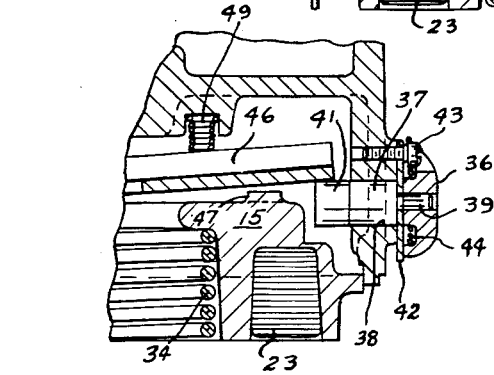
INVENTOR.
ELDRON G. ROEHM
BY Tom Walker
ATTORNEY United States Patent Office 2,974,756
Patented Mar. 14, 1961

2,974,756

AUTOMATIC RESET BRAKE RELEASE

Eldron G. Roehm, Dayton, Ohio, assignor to The Reliance Electric and Engineering Company, Cleveland, Ohio, a corporation of Ohio Filed Mar. 3, 1958, Ser. No. 718,688

4 Claims. (Cl. 188—171)

This invention relates to brakes for electric motors, and particularly to a manual brake release and automatic reset therefor.

In the electric motor art it is known to control rotation of the motor shaft through use of a brake, usually a friction type brake, which operates or is effective only when the motor is stopped or de-energized, it being the object of such a brake to inhibit inadvertent rotary displacement of the motor shaft when the motor is idle or stopped. According to one concept of brakes of this class, the friction brake is automatic in operation, being applied simultaneously with de-energizing of the motor and being released simultaneously with energizing or starting of the motor. However, for purposes of test, adjustment and the like it is sometimes desirable to release the brake while the motor is stopped whereby to free the shaft for rotation.

The object of the invention is to simplify the construction as well as the means and mode of operation of motor brakes, whereby such brakes may not only be economically manufactured, but will be more efficient and satisfactory in use, adaptable to a wide variety of applications, and be unlikely to get out of order.

It is a further object of this invention to provide for selective release of the motor brake through a manual control mounted for ready accessibility on the exterior of the motor housing.

Another object of the invention is to provide for automatic restoring of the brake to the normal brake controls, in conjunction with the automatic resetting of the external manual control.

A further object of the invention is to obviate the use of a plurality of brake release assemblies, it being proposed to provide a single release mechanism subject to automatic and to manual operation as described.

Still another object of the invention is to provide for automatic resetting of the manual brake release control in conjunction with the starting of the motor whereby to obviate misoperation as might result from neglect to reset the manual control were it necessary to do so.

A further object of the invention is to provide an automatic reset brake possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in longitudinal section through one end of an electrical motor showing a brake mechanism and the release controls therefor in accordance with the illustrated embodiment of the invention, Fig. 1 being taken along an irregular line as indicated at 1—1 in Fig. 2;

Fig. 3 is a view in cross section, taken substantially along the line 3—3 of Fig. 1;

Fig. 4 is a view in horizontal section taken substantially along the line 4—4 of Fig. 2;

Fig. 5 is a view similar to Fig. 4 but fragmentary in form and showing the manual release control adjusted to its brake releasing position.

Like parts are indicated by similar characters of reference throughout the several views.

Figure 1:
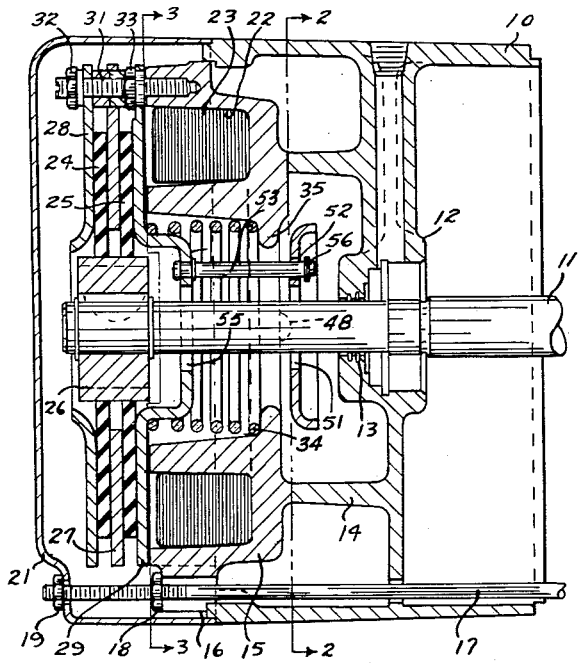

Referring to the drawings, brake mechanism in accordance with the illustrated embodiment of the invention is an integral part of an electric motor assembly. Thus, the motor housing includes a cylindrical end portion 10 adapted to what may be considered to be its inner end (the right hand end as shown) to be attached to the center or field ring portion of the motor housing. The motor shaft 11 extends through and beyond the housing 10 in approximately the center thereof, the housing having a transverse partition 12 providing a bearing 13 for the shaft. The wall 12 further provides a lateral extension 14 projecting toward the opposite or left hand end of the housing 10 and acting as a seat for an annular body 15. The latter has a circumferential series of peripheral tangs 16 (Fig. 3) which are in abutting relation to the outer or left hand end of the housing portion 10, the body 15 being in effect received within such outer end of the housing. Through each of the tangs 16 extends a longitudinal bolt 17 projecting through the housing 10 and toward the opposite end of the motor where it is suitably anchored. The outer end of each bolt 17 is screw threaded as indicated and a nut 18 is turned thereon into engagement with a respective tang 16, the construction and arrangement of parts being such as to seat the body 15 firmly upon the housing 10 so that it in effect becomes a part thereof. The threaded portions of the bolts 17 also receive nuts 19 at their outer extremities by which there may be held over the outer end of the housing 10 a cover member 21 which, as will be seen, surrounds and encloses the brake mechanism.

The outwardly facing side of the body 15 is formed with an annular chamber 22 in which is installed an electrically energizable coil 23. In parallel adjacent relation to the outwardly facing side of the body 15 is a friction brake assembly comprising spaced apart non-metallic friction discs 24 and 25 mounted for unison rotation to the periphery of a hub number 26 keyed to the shaft 11 to rotate therewith. The discs 24 and 25 are suitably connected to the hub 26 as for example by splining as indicated. Between the discs 24 and 25 is a friction plate 27. In flanking relation to the friction discs are a brake plate 28 and an armature plate 29, the latter being adjacent to the body 15 and covering the annular opening 22 in such manner as to be subject to retraction or to motion toward the body 15 upon energizing of the coil 23. The assembly of friction plates is held against rotary motion by threaded bolts 31 passed through circumferentially spaced apart points in the peripheries thereof and threaded into tapped openings in the peripheral area of the body 15. A nut 32 limits the outward movement of the plate assembly along the threaded studs 31, and a nut 33 specifically limits outward movement of the armature plate 29, both nuts being of course adjustable to vary the amounts of permitted motion.

A compression spring 34 is received in the center of the body 15, seated on an internal ledge 35 therein and pressing against the armature plate 29 in a direction to urge it outwardly away from the body 15 and in a direction to press the assembly of friction discs and plates upon the brake plate 28. The tendency of the spring 34, therefore, is to effectuate or to energize the brake mechanism and in the assembly of parts a spring 34 is selected which when installed in the body 15 between the ledge 35 and the plate 29 will be under compression so that a force is provided normally to apply a braking pressure wherein the friction discs 24 and 25 are squeezed between the several plates 27, 28 and 29 whereby to inhibit rotation of the shaft 11. Under such applied braking pressure, the armature plate 29 takes up a position spaced from the adjacent face of the body 15. Energizing of the coil 23 serves to retract the plate toward such face and to seat it thereon, further compressing the spring 34 and removing the applied pressure in the assembly of brake elements whereby the brake is in effect released and the shaft 11 is free to turn. Upon de-energizing of the coil 23 the armature 29 is returned to control of the spring 34 and reassumes a clamping relation with respect to the brake disc assembly and so reapplies the braking pressure.

The energizing and the de-energizing of the coil 23 may be individually controlled, but it will be understood that this action will normally take place in correspondence with the energizing and de-energizing of the motor windings in order that the brake may be applied at the same time that the motor is stopped and in order that the brake may be released at the same time that the motor is started.

Figure 6:
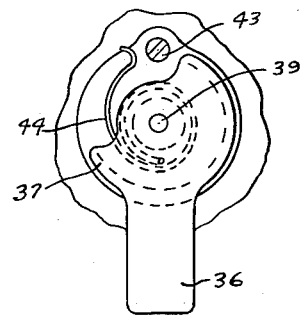
Fig. 6 is a detailed view in front elevation of the motor housing, showing the manual brake release control thereon.
Figure 2:
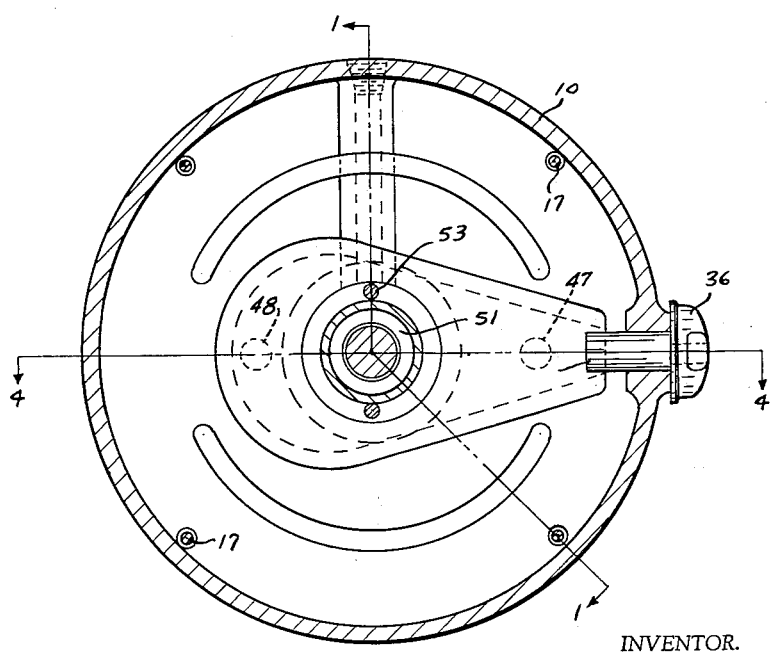
Fig. 2 is a view in cross section taken substantially along the line 2—2 of Fig. 1.

For manual release of the brake in periods of motor idleness, which may be desirable for test, adjustment or like purposes, there is provided on the exterior of the housing 10 a handle 36 (see Fig. 6) rotatively adjustable relatively to the housing. The handle 36 is a part of a cam and handle assembly further comprising a cylindrical body 37 rotatably mounted in a through opening 38 in the wall of the housing. A reduced diameter knurled stud 39 projects from one end of the body 37 to the exterior of the housing and the handle 36 is pressed thereon. From the opposite end of the body 37 there projects into the interior of the housing an eccentrically positioned half round cam 41 formed by cutting away a part of the inwardly projecting end of the body. The body 37 is held in position in the opening 38 by a plate 42 fastened to the outside of the housing in surrounding relation to the reduced diameter stud 39 by a screw 43. That part of the handle 36 facing the plate 42 is annularly recessed to receive a torsion spring 44 which at its one end is hooked around or anchored to the screw 43 and which at its other end is connected to the handle by means of an opening 45 therein. The spring 44 tends to hold the handle 36 in the upright position illustrated and to resist turning motion thereof, such motion serving to tension the spring so that upon release of the handle from a rotary adjusted position the spring tends to turn or to reset the handle to its normal upright position. Rotary motion of the handle 36, it will be understood, is partaken of by the body 37 and eccentric projection 41 thereon inasmuch as the handle is in effect secured to the stud through the knurled stud 39.

The eccentric portion 41 of the cam and handle assembly underlies one end of a release plate 46 which normally rests upon spaced apart pads 47 and 48, integrally formed on the body 15 on what may be considered to be the inwardly facing side thereof. Compression springs 49 are seated in the transverse wall 12 of the housing 10 and urge the release plate 46 to a seat on the pads 47 and 48. Intermediate its engagement with the pads 47 and 48, the release plate 46 has an opening 51 through which the shaft 11 passes. On opposite sides of the opening 51 are other, smaller diameter, openings 52 each providing for the passage therethrough of a rod 53 extending inwardly in the housing from the armature plate 29. Thus, the mid portion of the armature plate 29 is formed with a depressed portion 54 having an opening 55 through which a shaft 11 passes. On opposite sides of the opening 55 the rods 53 are riveted or otherwise secured to the depressed portion 54 of the armature plate in such manner that the rods partake of the bodily shifting motions of the armature plate as before described. The rods 53 are attached to the plate 29 at their one ends. Their opposite ends extend through respective openings 52 in the release plate 46 and beyond such openings have limit rings 56 mounted thereon.

As may be seen from the construction and arrangement of parts the rods 53 are freely slidable in the release plate 46. Since the latter is normally held to a seat on the body 15 by springs 49 it does not partake of the normal shifting movements of the armature 29 as effected in response to the energizing and de-energizing of the coil 23. In the position of applied brake pressure, however, the limit rings 56 on the rods 53 lie near to the release plate 46 so that a lifting or retracting movement of the release plate toward the transverse wall 12 will serve through the rings 56 to pull axially upon the rods 53 and thereby to retract the armature plate 29. Motion of the plate 46 in this sense is accomplished by the cam like projection 41 on the body 37 which, as noted, underlies one end of the plate 46. In response to a turning motion of the handle 36 the portion 41 rises to engage the underside of the plate 46, and as turning motion of the handle is continued, the plate 46 is lifted, pivoting about the far pad 48 of the pair of pads upon which it normally rests. The relationship of the parts is such as to provide for a limited amount of movement of the plate 46, which movement as transmitted through the rods 52 to the plate 29 is effective to retract the plate a part only of the distance by which it is retractable by the coil 23 but a distance sufficient to release the braking pressure. Accordingly, turning of the handle 36 in a rotary sense to raise the eccentric or cam portion 41 to its highest point results in a release of the braking action upon shaft 11, freeing such shaft for rotation in the same manner as is effected by energizing of the coil 23. Further, since the retracting motion of the armature plate 29 is accomplished against the urging of the spring 34, there is a reactant force generated by the spring and through the plate 29, rods 53 and plate 46 which is applied to the eccentric or cam portion 41 in a manner to resist return movement of the handle 36 to its normal upright position. The applied pressure is greater than that exerted by the torsion spring 44 with the result that when the handle has been turned to an operating position it will tend to remain in such position. The handle may be reset to normal manually and the brake thereby restored to operation under pressure of the spring 34. Further in accordance with the instant inventive concept, however, the resetting of the manual brake release control is an automatic operation occurring upon the next occasion of the energizing of coil 23. Thus, with the armature plate 29 partly retracted as described and applying a frictional holding pressure to the manual brake release, if the coil 23 is now energized the plate 29 will be retracted to its fullest extent. This motion tends to move the rods 53 relatively to the release plate 46 with the result that the frictional pressure applied by this plate to the eccentric portion 41 of the cam and handle assembly is relieved. The spring 44 accordingly is enabled to return the cam and handle assembly to its normal position as illustrated in Fig. 4, the operative position of the parts being shown in Fig. 5. In the operation of a motor equipped according to the instant invention, therefore, should it be found necessary to set the cam and handle assembly to release the brake in a period of engine idleness the assembly may simply be left in an operating position and when the motor is next started the manual release device will be reset to its normal position in consequence thereof and as a part of the same operation energizing the coil 23.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In an electric motor, a housing, a shaft rotatably mounted in said housing, an electrically energizable coil surrounding said shaft, brake means to inhibit rotation of said shaft, including an armature plate on one side of said coil movable toward said coil in response to the energizing thereof to release said brake means, spring means stressed by motion of said armature plate toward said coil and returning said plate in the opposite direction upon de-energizing of said coil, a release plate on the opposite side of said coil in parallel relation to said armature plate, rods interconnecting said armature plate, and said release plate extending longitudinally of and through said coil, said rods being connected at their one ends to said armature plate for unison reciprocating motion and at their other ends to said release plate for unison motion in one direction only, means accessible from outside said housing to move said release plate in said one direction only and spring means different from the first recited spring means urging said release plate in the opposite direction and stressed by operation of said means outside housing to move said release plate in said one direction.

2. In an electric motor, a housing, a transversely extending stationary wall in said housing, a shaft longitudinally disposed in said housing and rotatably mounted in said wall, an electrically energizable coil mounted on said wall in surrounding relation to said shaft, brake means to inhibit rotation of said shaft, including an armature plate parallel to said wall and disposed on one side of said coil to move toward said coil in response to the energizing thereof to release said brake means, spring means stressed by motion of said armature plate toward said coil and returning said plate in the opposite direction upon de-energizing of said coil, a release plate on the opposite side of said coil, spaced apart pads on said transverse wall providing a seat for said release plate, spring means urging said release plate to a seat on said pads, rods interconnecting said armature plate and said release plate extending longitudinally of and through said coil, said rods being connected at their one ends of said armature plate for unison reciprocating motion and at their other ends to said release plate for unison motion only in response to a lifting of said release plate from said pads, and means accessible from outside the housing to lift said release plate a limited distance from said pads to draw said armature plate a corresponding distance toward said coil, said release plate being returnable by said spring means to a seat on said pads under control of said lift means.

3. In an electric motor, a housing, a transverse stationary wall in said housing having a laterally projecting extension thereon defining an inner chamber in said housing, a body having a through longitudinal opening therein and seated on said lateral extension, means rigidly to hold said body on said extension, a shaft longitudinally disposed in said housing and rotatably mounted in said transverse wall, one end of said shaft extending through said inner chamber and through and beyond said body, an electrically energizable coil mounted on said body and surrounding said shaft, brake means to inhibit rotation of said shaft, including an armature plate outwardly of said coil and retractable toward said coil in response to the energizing thereof to release said brake means, a spring mounted in said body to bear on said armature plate and compressed by retracting motion of said armature toward said coil, said spring returning said armature plate in the opposite direction upon de-energizing of said coil, a release plate disposed in said inner chamber in generally parallel relation to said armature plate, spring means urging said release plate toward said body to a seat thereon, rods interconnecting said armature plate and said release plate extending longitudinally of and through said body, said rods being connected at their one ends to said armature plate for unison reciprocating motion and at their other ends to said release plate for unison motion of said release plate only in connection with a lifting thereof or in a direction away from said body, and means accessible from outside said housing to effect limited motion of said release plate as described for a limited retracting of said armature plate toward said coil.

4. An electric motor according to claim 3, characterized in that said body provides spaced apart pads for the seating of said release plate, said last named means applying a lifting force to said plate at one side thereof whereby said plate is lifted from one of said pads while pivoting on the other one thereof.

References Cited in the file of this patent

UNITED STATES PATENTS

| | | |
|---|---|---|
| 596,097 | Wellman | Dec. 28, 1897 |
| 2,512,565 | Hallander | June 20, 1950 |
| 2,851,129 | Doerries | Sept. 9, 1958 |

FOREIGN PATENTS

| | | |
|---|---|---|
| 556,985 | Great Britain | Oct. 29, 1943 |